US006809122B2

(12) United States Patent
Zhang et al.

(10) Patent No.: US 6,809,122 B2
(45) Date of Patent: Oct. 26, 2004

(54) METHOD FOR REDUCING THE MAXIMUM WATER CONCENTRATION IN A MULTI-PHASE COLUMN REACTOR

(75) Inventors: Jianping Zhang, Ponca City, OK (US); Rafael L. Espinoza, Ponca City, OK (US); Sergio R. Mohedas, Ponca City, OK (US); Beatrice C. Ortego, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/193,357

(22) Filed: Jul. 11, 2002

(65) Prior Publication Data

US 2003/0125397 A1 Jul. 3, 2003

Related U.S. Application Data

(60) Provisional application No. 60/344,228, filed on Dec. 28, 2001, and provisional application No. 60/344,229, filed on Dec. 28, 2001.

(51) Int. Cl.[7] ........................ C07C 27/00; B01D 12/00; B01D 21/00; B01D 17/12
(52) U.S. Cl. ........................ 518/700; 210/521; 210/523; 210/801; 210/805
(58) Field of Search ........................ 518/700; 210/521, 210/523, 801, 805

(56) References Cited

U.S. PATENT DOCUMENTS

| | | |
|---|---|---|
| 2,509,136 A | 5/1950 | Cornell |
| 2,617,816 A | 11/1952 | Crowell et al. |
| 3,432,036 A | 3/1969 | Kaiser |
| 3,807,142 A | 4/1974 | Rich et al. |
| 4,093,643 A | 6/1978 | Vannice et al. |
| 4,428,839 A | 1/1984 | Davies et al. |

(List continued on next page.)

FOREIGN PATENT DOCUMENTS

AU 200066518 10/2000 ............ C08J/7/04

OTHER PUBLICATIONS

D. Schanke et al., *Study of the Deactivation Mechanism of $Al_2O_3$ Supported Cobalt Fischer–Tropsch Catalysts*, Catalysis Letters 34(1995) pp. 269–284.
V.A. Kirillov et al., *A Mathematical Model of Fischer–Tropsch Synthesis in a Slurry Reactor*, Studies in Surface Science and Catalysis, vol. 119, A. Parmaliana et al. Ed., Elsevier Science, 1998, pp. 149–154.
A.M. Hillmen et al., *Study of the Effect of Water on Alumina Supported Cobalt Fischer–Tropsch Catalysts*, Applied Catalysis 186(1999) pp. 169–188.
P.J. van Berge et al., *Oxidation of Cobalt Based Fischer–Tropsch Catalysts as a Deactivation Mechanism*, Catalysis Today 58(000) pp. 321–334.
Schulz et al., *Applied Catalyst* vol. 186 Nos. 1,2 Oct. 1999(229 p).

(List continued on next page.)

*Primary Examiner*—J. Parsa
(74) *Attorney, Agent, or Firm*—Conley Rose, P.C.

(57) ABSTRACT

The present invention relates to a method and apparatus for reducing the maximum water concentration in multi-phase reactors operating at Fischer-Tropsch conditions. In a preferred embodiment of the present invention, a method of reducing the maximum concentration of water in a multi-phase reactor containing an expanded slurry bed and a water-rich slurry region for Fisher-Tropsch synthesis includes changing the flow structure of a predetermined region in the reactor. The flow structure may be changed by introducing a mixing enhancing fluid into the predetermined region, installing baffles into the predetermined region, or by other methods known in the art. Preferably the predetermined region is located between ½ H and H and between ½ R and R, where H is the height of the expanded slurry bed and R is the radius of the reactor.

35 Claims, 5 Drawing Sheets

U.S. PATENT DOCUMENTS

| | | | |
|---|---|---|---|
| 4,520,215 A | 5/1985 | Owen et al. | |
| 4,605,678 A | 8/1986 | Brennan et al. | |
| 4,973,453 A | 11/1990 | Agee | |
| 5,015,366 A | 5/1991 | Ruether et al. | |
| 5,023,276 A | 6/1991 | Yarrington et al. | |
| 5,240,593 A | 8/1993 | Moredock | |
| 5,260,239 A | 11/1993 | Hsia | |
| 5,268,344 A | 12/1993 | Pedrick et al. | |
| 5,276,237 A | 1/1994 | Mieville | 585/500 |
| 5,288,673 A | 2/1994 | Behrmann et al. | |
| 5,348,982 A | 9/1994 | Herbolzheimer et al. | |
| 5,407,644 A | 4/1995 | Rytter et al. | |
| 5,422,375 A | 6/1995 | Rytter et al. | |
| 5,520,890 A | 5/1996 | Lorentzen et al. | |
| 5,527,473 A | 6/1996 | Ackerman | |
| 5,565,177 A | 10/1996 | Cetinkaya | |
| 5,639,798 A | 6/1997 | Wilson et al. | |
| 5,770,629 A | 6/1998 | Degeorge et al. | |
| 5,811,469 A | 9/1998 | Leviness et al. | |
| 5,827,902 A | 10/1998 | Maretto et al. | |
| 5,827,903 A | 10/1998 | White et al. | |
| 5,844,006 A | 12/1998 | Jager et al. | |
| 5,900,159 A | 5/1999 | Engel et al. | |
| 5,917,078 A | 6/1999 | Battosta et al. | |
| 5,939,350 A | 8/1999 | Singleton | |
| 5,948,378 A | 9/1999 | Koveal et al. | |
| 5,958,985 A | 9/1999 | Geerlings et al. | 518/700 |
| 5,961,933 A | 10/1999 | Casanave et al. | |
| 5,962,537 A | 10/1999 | Leviness | |
| 5,981,608 A | 11/1999 | Geerling et al. | 518/715 |
| 6,060,524 A | 5/2000 | Casanave et al. | |
| 6,068,760 A | 5/2000 | Benham et al. | |
| 6,069,179 A | 5/2000 | Rytter et al. | |
| 6,100,304 A | 8/2000 | Singleton et al. | 518/715 |
| 6,114,400 A | 9/2000 | Nataraj | 518/715 |
| 6,156,809 A | 12/2000 | Clark et al. | 518/719 |
| 6,169,120 B1 | 1/2001 | Beer | |
| 6,191,066 B1 | 2/2001 | Singleton et al. | 502/332 |
| 6,225,358 B1 | 5/2001 | Kennedy | |
| 6,271,432 B2 | 8/2001 | Singleton et al. | 585/700 |
| 6,277,338 B1 | 8/2001 | Agee | |
| 6,403,660 B1 | 6/2002 | Espinoza et al. | 518/700 |
| 6,462,097 B1 | 10/2002 | Martino et al. | |

OTHER PUBLICATIONS

D. Schanke et al., *Reoxidation and Deactivation of Supported Cobalt Fischer–Tropsch Catalysts*, Energy & Fuels, vol. 10, No. 4(1996) 5 pp.

PCT International Search Report for International Application No. PCT/US03/21560 dated Nov. 17, 2003 (2 p.).

METHOD FOR REDUCING THE MAXIMUM WATER CONCENTRATION IN A MULTI-PHASE COLUMN REACTOR

CROSS-REFERENCE TO RELATED APPLICATIONS

This application is related to commonly assigned, co-pending U.S. Provisional Applications Ser. No. 60/344,228, filed Dec. 28, 2001 and entitled "Method for Reducing Water Concentration in a Multi-phase Column Reactor," Ser. No. 60/344,229, filed Dec. 28, 2001 and entitled Water Removal In Fischer-Tropsch Processes, and Ser. No. 10/034,452, filed Dec. 28, 2001 and entitled Water Stripping and Catalyst/Liquid Product Separation System, all of which are hereby incorporated herein by reference.

FIELD OF THE INVENTION

The present invention relates to a method for the preparation of hydrocarbons from synthesis gas, i.e., a mixture of carbon monoxide and hydrogen, typically labeled the Fischer-Tropsch process. Particularly, this invention relates to a method for reducing the maximum water concentration in multi-phase column reactors operating at Fischer-Tropsch conditions.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into useful hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction is the catalytic hydrogenation of carbon monoxide to produce any of a variety of products ranging from methane to higher alkanes, olefins, and aliphatic alcohols. Research continues on the development of more efficient Fischer-Tropsch catalyst systems and reaction systems that increase the selectivity for high-value hydrocarbons in the Fischer-Tropsch product stream.

There are continuing efforts to design reactors that are more effective at producing these desired products. Product distribution, product selectivity, and reactor productivity depend heavily on the type and structure of the catalyst and on the reactor type and operating conditions. Catalysts for use in such synthesis usually contain a catalytically active metal of Groups 8, 9, or 10 (in the New notation of the periodic table of the elements, which is followed throughout). In particular, iron, cobalt, nickel, and ruthenium have been abundantly used as the catalytically active metals. Cobalt and ruthenium have been found to be most suitable for catalyzing a process in which synthesis gas is converted primarily to hydrocarbons having five or more carbon atoms (i.e., where the $C_{5+}$ selectivity of the catalyst is high).

Originally, the Fischer-Tropsch synthesis was operated in packed bed reactors. These reactors have several drawbacks, such as difficulty of temperature control, that can be overcome by using gas-agitated slurry reactors or slurry bubble column reactors. Gas-agitated reactors, sometimes called "slurry reactors," "slurry bubble columns," or "multi-phase reactors" operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are converted to gaseous and/or liquid products. If gaseous products are formed, they enter the gas bubbles and are collected at the top of the reactor. Liquid products are recovered from the suspended solid using any suitable technique, such as settling, filtration, magnetic separation, hydrocycloning, or the like, and then separating the liquids.

A known problem in multi-phase reactors, however, is that water is continuously formed during Fisher-Tropsch synthesis in the reactors. The presence of water limits conversion and prematurely deactivates catalyst systems such as iron and cobalt-based Fisher-Tropsch catalysts [e.g., Schanke et al., Catalysis Letter 34 (1995) 269; Hilmen et al., Applied Catalysis, 186 (1999) 169; van Berge et al., Catalysis Today, 58 (2000) 321). Thus, a high water partial pressure correlates to a high deactivation rate. In addition, it is believed that above a certain partial pressure of water, the catalyst deactivates faster. For example, some have observed that partial pressures of water above about 6 bar deactivate certain Fischer-Tropsch catalysts, while partial pressures of water below that level do not [Schanke et al., Energy & Fuels, 10 (1997) 867]. It is further believed that the relationship between deactivation rate and water concentration may have one or more thresholds, between which the relationship may or may not be linear. Furthermore, the relationship between deactivation rate and water concentration may depend on other physical parameters of the system. Regardless of the precise nature of the relationship, it is believed that reducing reactor water concentration would reduce the rate of catalyst deactivation.

For any given cobalt-based catalyst, along with the $H_2/CO$ ratio and the reaction temperature, the total pressure has a direct influence on the wax selectivity, in that a higher pressure will result in a higher wax selectivity. However, a higher total pressure (at any given degree of per-pass conversion) also correlates to a higher water partial pressure and therefore a higher deactivation rate. Therefore, if reactors are operated at conditions that are conducive to higher alpha values, per-pass conversion will necessarily have to be low to avoid premature catalyst deactivation due to water. A low per-pass conversion is undesirable, however, because it results in higher capital investment and operating costs. Additionally, for iron-based catalysts, the water not only has a negative effect on the catalyst deactivation rate, but it also inhibits the rate of reaction (see for example, Kirillov, V. A. et al., in Natural Gas Conversion V, Studies in Surface Science and Catalysis, vol. 119, A. Parmaliana et al., ed., Elsevier Science, New York, pp. 149–154, 1998).

The water partial pressure is therefore a constraint that prevents the realization of the kinetic and/or wax selectivity potential of iron and cobalt-based Fisher-Tropsch catalysts. Therefore, in order to improve the efficiency of multi-phase reactors using iron and cobalt-based catalyst systems, there exists a need for a method to reduce the maximum water concentration reached in the system during Fisher-Tropsch synthesis.

SUMMARY OF THE INVENTION

The present invention relates to a method for reducing the maximum water concentration in multi-phase reactors operating at Fischer-Tropsch conditions. More particularly, the present invention is based on the recognition of a high water concentration region and alteration of the flow patterns within the reactor in order to reduce the maximum water concentration in the reactor. This method increases the catalyst lifetime, thereby reducing the operating cost of the Fischer-Tropsch process.

In a preferred embodiment of the present invention, a method of reducing the maximum concentration of water in a multi-phase reactor containing an expanded slurry bed and a water-rich slurry region for Fisher-Tropsch synthesis includes changing the flow patterns of the fluids within the reactor and/or diluting the water concentration in the high water concentration region. More precisely, flow patterns are modified so as to cause a mixing of fluids from a water-rich region in the reactor with fluids in the rest of the reactor. The flow patterns may be changed by introducing a mixing enhancing fluid into the predetermined region, installing baffles into the predetermined region, or the combination of the two, or by other mechanical mixing methods known in the art. The introduction of the mixing enhancing fluid can also lead to a dilution of the water concentration in the predetermined region. In some reactors, the water-rich region is located between ½ H and H and between ½ R and R, where H is the height of the expanded slurry bed and R is the radius of the reactor. The expanded slurry bed is herein defined as the region within a reactor where an intimate liquid-solid-gas phase contact exists. The flow patterns are preferably changed or disrupted so that the difference between the highest water concentration in the reactor and the lowest water concentration in the reactor is minimized.

The present invention allows higher per-pass conversions of syngas and/or use of higher total pressures at any degree of conversion, while protecting the Fischer-Tropsch catalyst from an excessive oxidation rate.

BRIEF DESCRIPTION OF THE FIGURES

A better understanding of the present invention can be obtained when the following detailed description of the preferred embodiment is considered in conjunction with the following drawings, wherein.

DETAILED DESCRIPTION OF THE PREFERRED EMBODIMENTS

In typical Fischer-Tropsch processes, water begins to accumulate unevenly in the operating reactor, forming a water-rich slurry region. As mentioned above, this is undesirable because water has a negative effect on the catalyst deactivation rate and inhibits the rate of reaction. To minimize this problem, the present invention changes the fluid flow patterns such that slurry from a water-rich region is mixed with slurry from regions having lower water concentrations. This effectively reduces the maximum water concentration in the reactor, thereby reducing the catalyst deactivation rate in the reactor.

Figure 1:
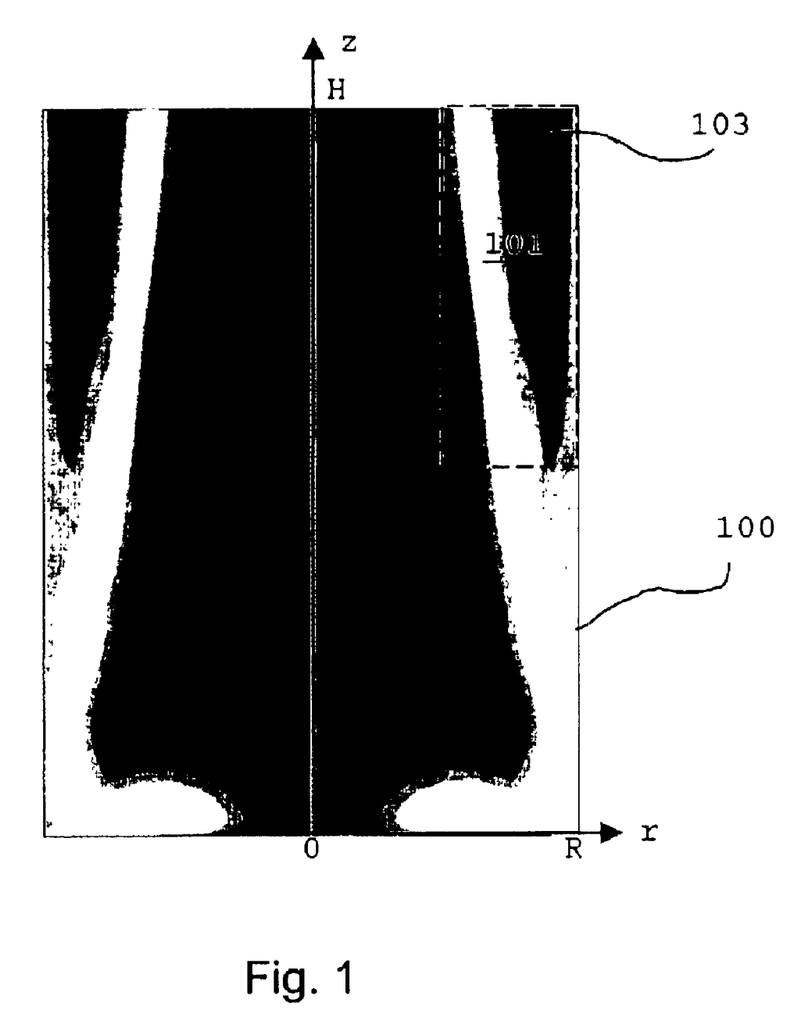
FIG. 1 is a contour diagram of the water concentration in the liquid phase in a multi-phase reactor operating at Fischer-Tropsch conditions.
Figure 2:
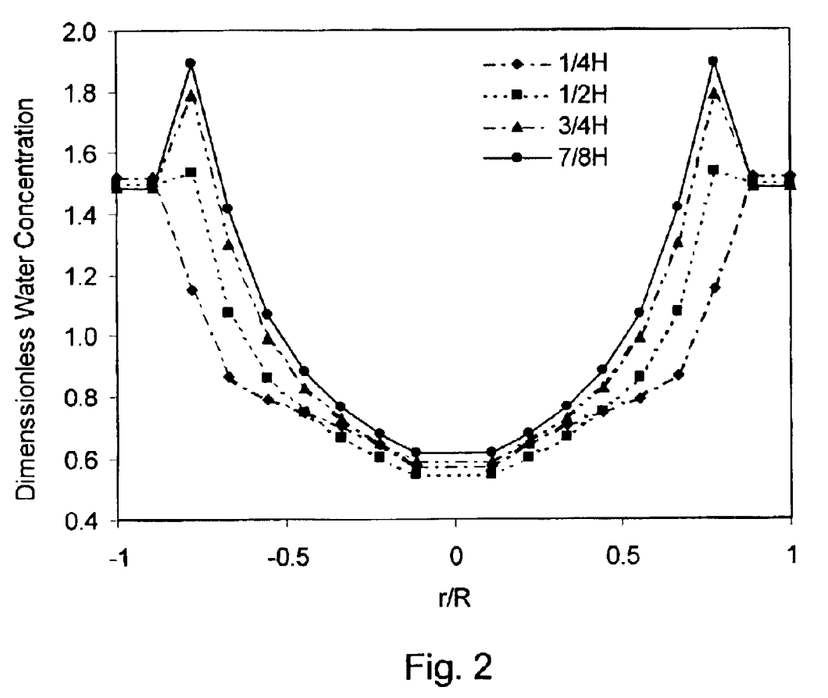
FIG. 2 is a plot of radial profiles of the dimensionless water concentration at four elevations along the expanded slurry bed.

Referring initially to FIG. 1, a contour of water concentration in the liquid phase in an exemplary multi-phase 100 reactor operating at Fischer-Tropsch conditions is shown. The values of water concentration are color coded, where red indicates a high water concentration and blue indicates a low water concentration region. The water concentration distribution in the reactor is further illustrated in FIG. 2, wherein the radial profiles of the dimensionless water concentration are shown at four elevations along the expanded slurry bed. The dimensionless water concentration is defined as the local water concentration divided by the average water concentration of the whole reactor. As shown in FIGS. 1 and 2, the water concentration in the near wall region at the upper half of the expanded slurry bed in the reactor is significantly higher than in other regions in the reactor. More specifically, if the expanded slurry bed is defined as having a height H and a radius R, the high water concentration tends to be located radially between approximately 0.5R and R and vertically between approximately 0.5H and H, in the region labeled 101. Still more specifically, the high water concentration is located radially between approximately 0.75R and R, and still more specifically between approximately 0.75R and 0.875R, and vertically between approximately 0.75H and H, with the highest concentrations being in region 103.

Figure 3:
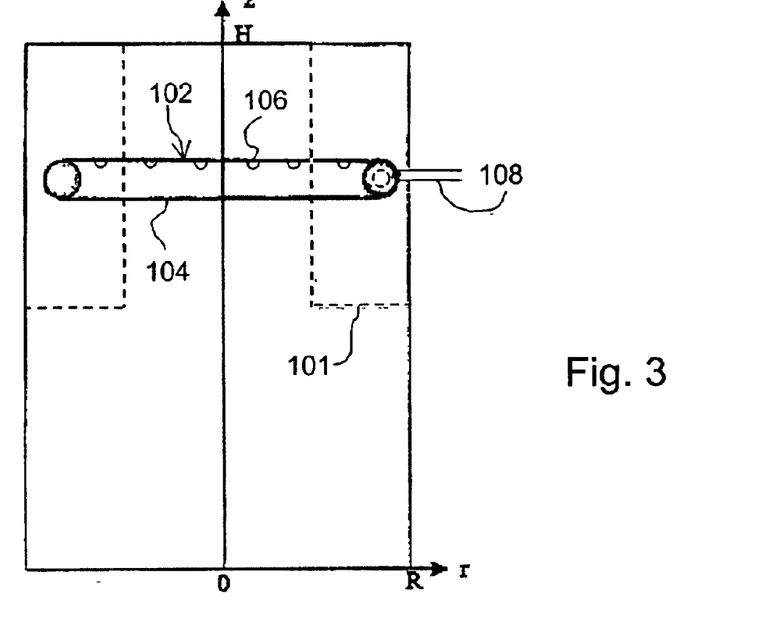
FIG. 3 is a schematic cross-sectional side view of a multi-phase reactor constructed in accordance with a preferred embodiment of the present invention.
Figure 4:
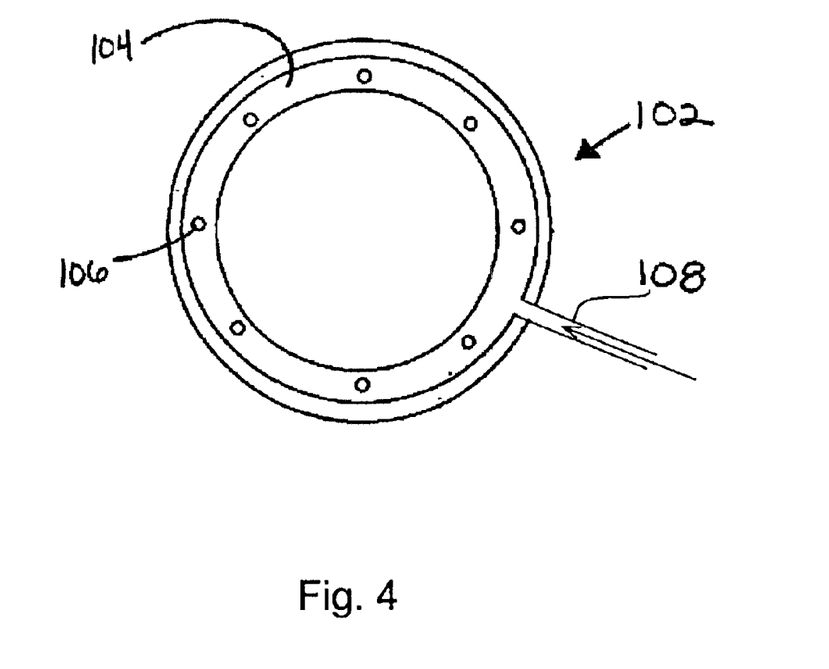
FIG. 4 is a schematic top view of an annular or toroidal fluid distributor in accordance with a preferred embodiment of the present invention.

Referring now to FIGS. 3 and 4, in one embodiment of the invention, a mixing enhancing fluid distributor 102 is included in the reactor. The mixing enhancing fluid distributor 102 preferably, but not necessarily, comprises an annular or toroidal ring 104 having output ports 106 and a feed line 108. Ports 106 are preferably but not necessarily uniformly distributed on ring 104. In one preferred embodiment, output ports 106 feed a mixing enhancing fluid into the high water concentration region, i.e. the mixing enhancing fluid distributor 102 is positioned in the slurry between approximately 0.5R and R and between approximately 0.5H and H. Still more specifically, the mixing enhancing fluid distributor 102 is positioned radially between approximately 0.75R and R and still more preferably between 0.75R and 0.875R, and vertically between approximately 0.75H and H. The mixing enhancing fluid can be gas, or liquid, or gas and liquid mixtures. The mixing enhancing gas can be synthesis gas, inert gas, methane-rich gas, light hydrocarbons, hydrogen containing gas, tail gas from a Fischer-Tropsch reactor, tail gas from a GTL plant, tail gas from an olefin plant, liquids vaporizing at operating conditions, or a combination thereof. The synthesis gas can comprise a mixture of hydrogen and carbon monoxide having a hydrogen-to-carbon monoxide ratio that is the same as, lower, or higher than that of the feed to the reactor. Alternatively, the mixing enhancing gas can be a stream from a tail gas from other processes in a Gas-to-Liquids plant, including without limitation: hydrotreating, hydrocracking, or olefin production plants. The mixing enhancing liquid can be liquid hydrocarbons from the product streams of the Fischer-Tropsch reactor or from other processes in a Gas-to-Liquids plant.

Output ports 106 are preferably but not necessarily uniformly distributed around the circumference of the mixing enhancing fluid distributor 102, so that the flow of the mixing enhancing fluid into the high water concentration region disrupts or shifts the pattern of slurry flow within the reactor. Thus, it may also be desired to provide at least one, more preferably at least four, and still more preferably at least eight output ports 106. Further, in some embodiments, it may be preferred to provide a plurality of mixing enhancing fluid distributors 102 positioned at different heights and/or different radial positions within the reactor, preferably but not necessarily between approximately 0.5R and R and between approximately 0.5H and H, more preferably between approximately 0.75R and R and between approximately 0.75H and H.

It is preferred that the degree of mixing attained be sufficient to distribute the water present in the reactor evenly throughout the reactor. More precisely, it is preferred that the degree of mixing be such that the highest water concentration in the reactor is no more than 50% greater than the average water concentration in the reactor. It is still more preferred that the highest water concentration in the reactor be no more than 20% greater than the average water concentration in the reactor, and most preferred that the highest concentration be less than 10% greater than the lowest. In the embodiment shown in FIG. 3, the rate of flow of gas or liquid or the gas and liquid mixtures through mixing enhancing fluid distributor 102 is preferably sufficient to cause the desired degree of mixing.

Figure 5:
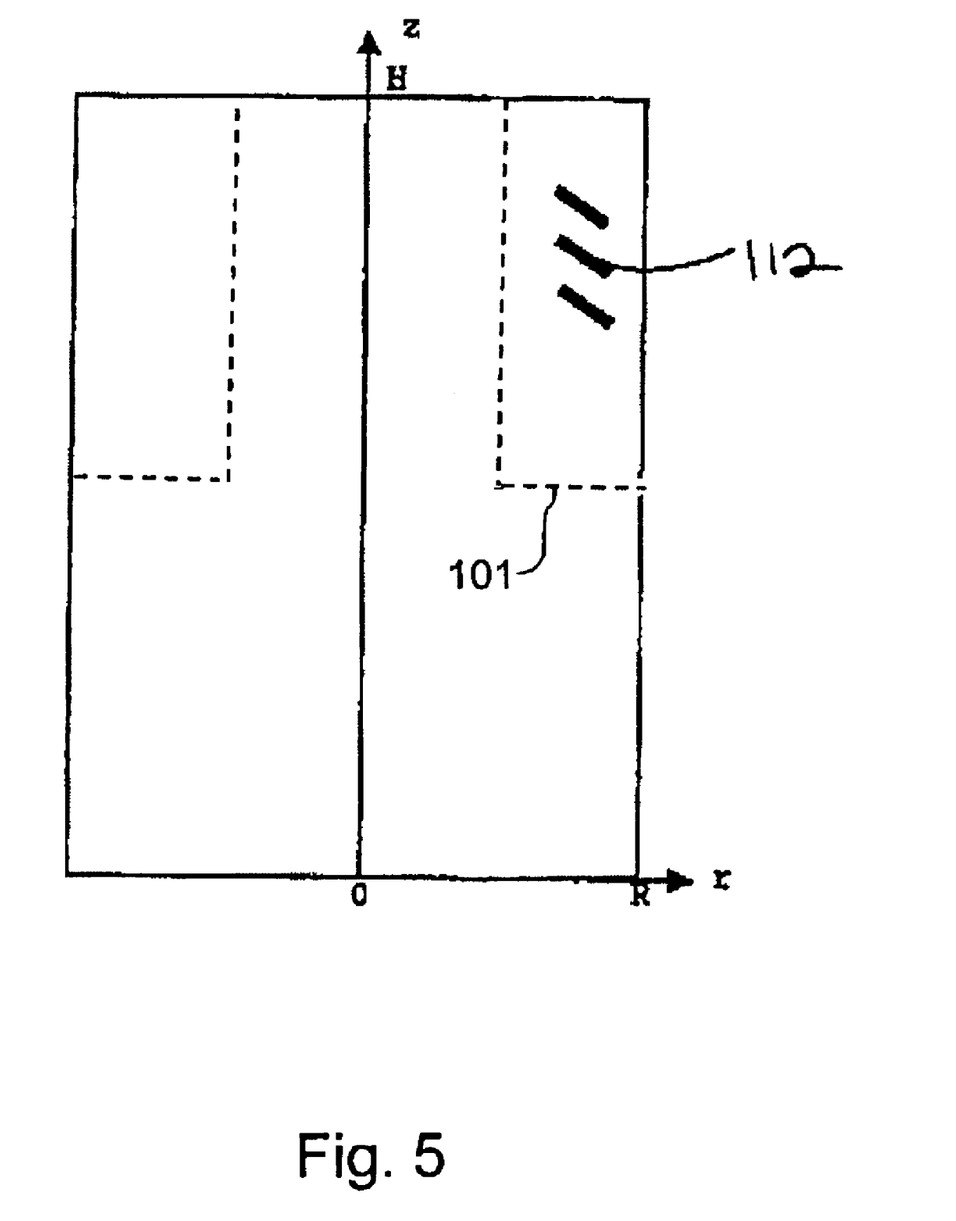
FIG. 5 is a schematic cross-sectional side view of a multi-phase reactor system in accordance with an alternative embodiment of the present invention.

Referring now to FIG. 5, in another preferred embodiment, one or more passive mixing devices, such as baffle plates 112, is positioned in the slurry between approximately 0.5R and R and between approximately 0.5H and H. The passive mixing device(s) is/are positioned between approximately 0.75R and R and between approximately 0.75H and H. Similarly to the mixing enhancing fluid distributor 102, the passive mixing device disrupts or shifts the pattern of slurry flow within the reactor, which in turn, reduces the maximum water concentration in the reactor.

Alternatively, baffle plates 112, which are static, can be replaced with one or more passive but movable devices, such as non-driven paddles (not shown), or with one or more powered mixing devices, such as power-driven paddles (not shown) or magnetic mixing devices (not shown).

Figure 6:
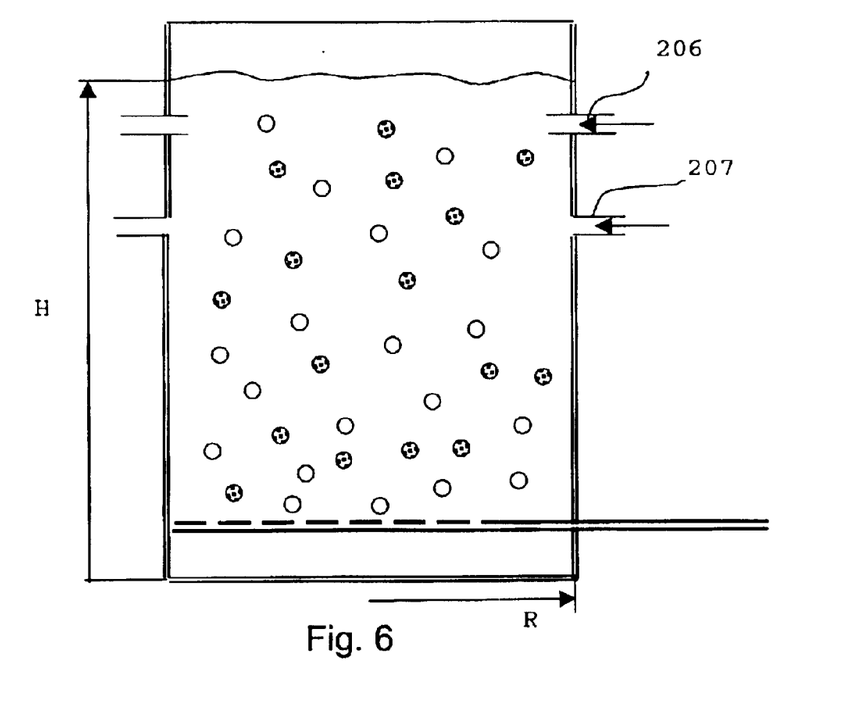
FIG. 6 is a schematic cross-sectional side view of a series of nozzles flush mounted on or protruding from the reactor wall in accordance with another preferred embodiment.
Figure 7:
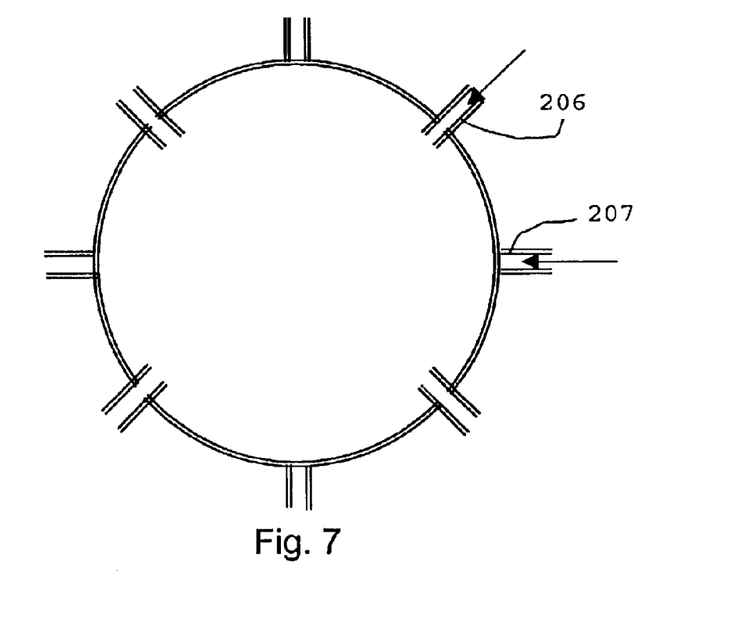
FIG. 7 is a schematic top view of a series of nozzles flush mounted on or protruding from the reactor wall in accordance with another preferred embodiment.

In another preferred embodiment of the invention, shown in FIGS. 6 and 7, the mixing enhancing fluid is introduced into the high water concentration region through a series of flush mounted nozzles 207 or protruding nozzles 206. The number of nozzles is preferably at least one, more preferably at least four, and still more preferably at least eight. If two or more nozzles are used, it is preferred that they be evenly distributed around the circumference of the reactor. It may be preferred to provide a plurality of mixing enhancing fluid nozzles positioned at different heights and/or different radial positions within the reactor between approximately 0.5R and R and between approximately 0.5H and H, more preferably between approximately 0.75R and R and between approximately 0.75H and H.

It will be understood that the configurations of either the mixing enhancing fluid distributor 102, nozzles 206, 207, or the baffle plates 112 or a combination thereof may be modified significantly without departing from the scope of the invention. More specifically, any method of disrupting the flow patterns that cause a localized concentration of water is contemplated. These include both powered and non-powered (static) mechanical devices, such as baffles 112, fins, paddles, magnetically driven mixing devices, and fluid devices such as gas or liquid distributor 102, nozzles 206, 207, and the like.

It is further contemplated that in some cases it may be desirable to remove water from the reactor in order to reduce the total water concentration in the reactor. Any suitable water removal means (i.e. separation methods) may be employed to remove water from the water-rich slurry region. Some of the water removal means may be incorporated into the multi-phase reactor itself, while others may be independent of the reactor and utilize a slurry transport means. It is contemplated that in cases where the water removal means is independent of the reactor, gas-disengaging means may be utilized between the reactor and the water removal means to ease separation. In addition, different water removal means may be combined with each other in various arrangements to increase the efficiency of overall water removal. Preferred separation methods include separation by phase addition or creation, separation by barrier, separation by solid agent, and separation by external field or gradient. Separation methods are disclosed in greater detail in the co-pending U.S. patent applications cited above. U.S. Ser. No. 60/344,229, filed Dec. 28, 2001 and entitled "Water Removal in Fischer-Tropsch Processes," which is incorporated herein by reference.

Fischer-Tropsch Operating Conditions

The feed gases charged to the process of the preferred embodiment of the present invention comprise hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67 to 2.5). Preferably, the feed gas stream contains hydrogen and carbon monoxide in a molar ratio of about 2:1. The feed gas may also contain carbon dioxide. The feed gas stream should contain a low concentration of compounds or elements that have a deleterious effect on the catalyst, such as poisons. For example, the feed gas may need to be pre-treated to ensure that it contains low concentrations of sulfur or nitrogen compounds such as hydrogen sulfide, ammonia and carbonyl sulfides.

The feed gas is contacted with a catalyst in a reaction zone. Mechanical arrangements of conventional design may be employed as the reaction zone including but not limited to, for example, slurry bubble column, reactive distillation column, or ebulliating bed reactors, among others, may be used. Accordingly, the size and physical form of the catalyst particles may vary depending on the reactor in which they are to be used.

The Fischer-Tropsch process is typically run in a continuous mode. In this mode, typically, the gas hourly space velocity, defined by dividing the gas flow rate by the volume of the expanded catalyst bed, may range from about 50 l/hr to about 10,000 l/hr, preferably from about 300 l/hr to about 2,000 l/hr. The gas hourly space velocity is defined at the standard condition where the pressure is 1 bar and temperature is 0 degree centigrade. The reaction zone temperature is typically in the range from about 160° C. to about 300° C. Preferably, the reaction zone is operated at conversion promoting conditions at temperatures from about 190° C. to about 260° C. The reaction zone pressure is preferably in the range of from about 80 psig (653 kPa) to about 1000 psig (6994 kPa), more preferably from 80 psig (653 kPa) to about 600 psig (4237 kPa), and still more preferably, from about 140 psig (1066 kPa) to about 500 psig (3497 kPa).

The products resulting from the process will have a great range of molecular weights. Typically, the carbon number range of the product hydrocarbons will start at methane and continue to the limits observable by modern analysis, about 50 to 100 carbons per molecule. The process is particularly useful for making hydrocarbons having five or more carbon atoms especially when the above-referenced preferred space velocity, temperature and pressure ranges are employed.

The wide range of hydrocarbons produced in the reaction zone will typically result in liquid phase products being present at the reaction zone operating conditions. Therefore, the effluent stream of the reaction zone will often be a mixed phase stream including liquid and vapor phase products. The effluent stream of the reaction zone may be cooled to condense the additional amounts of hydrocarbons and passed into a vapor-liquid separation zone separating the liquid and vapor phase products. The vapor phase material may be passed into a second stage of cooling for recovery of additional hydrocarbons. The liquid phase material from the initial vapor-liquid separation zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight. The gas phase recovered from the reactor zone effluent stream after hydrocarbon recovery may be partially recycled if it contains a sufficient quantity of hydrogen and/or carbon monoxide.

While the present invention has been disclosed and described in terms of a preferred embodiment, the invention is not limited to the preferred embodiment. For example, it will be understood that the various mechanical arrangements disclosed herein for the reducing the maximum water concentration in the reactor can be modified in number, shape, size, and configuration. In addition, various modifications to the operating conditions, feedstock, catalyst, and slurry content, among others, can be made without departing from the scope of the invention. In the claims that follow, any recitation of steps is not intended as a requirement that the steps be performed sequentially, or that one step be completed before another step is begun, unless explicitly so stated.

What is claimed is:

1. A method of reducing the maximum concentration of water in a multi-phase Fisher-Tropsch reactor containing an expanded slurry bed, comprising:

selecting a water-rich region in the expanded slurry bed, the water-rich slurry region being located between ½ H and H and between ½ R and R, where H is the height of the expanded slurry bed and R is the radius of the reactor; and changing the flow patterns of the slurry within the expanded slurry bed so as to cause mixing between the water-rich slurry region and slurry regions having lower water concentrations;

wherein the flow pattern is changed by a method selected from the group consisting of introducing a mixing enhancing fluid into the water-rich slurry region, providing at least one passive mixing device in the water-rich slurry region, and providing at least one power-driven mixing device in the water-rich slurry region.

2. The method according to claim 1, further comprising diluting the localized water concentration by adding a liquid or a gas.

3. The method according to claim 1, further comprising diluting the localized water concentration by adding a liquid or a gas, wherein the liquid or gas is added in the water-rich region.

4. The method according to claim 1 wherein the water-rich slurry region is located between ¾ H and H and between ¾ R and R.

5. The method according to claim 1 wherein the flow pattern is changed by introducing a mixing enhancing fluid into the water-rich slurry region.

6. The method according to claim 5 wherein the mixing enhancing fluid is a gas or gas mixture selected from the group comprising synthesis gas, inert gas, methane-rich gas, light hydrocarbons, hydrogen containing gas, tail gas from a Fischer-Tropsch reactor, tail gas from a GTL plant, tail gas from an olefin plant, liquids vaporizing at operating conditions, and combinations thereof.

7. The method according to claim 5, further comprising adding a feed gas to the reactor, wherein the mixing enhancing gas comprises synthesis gas having a hydrogen-to-carbon monoxide ratio that is the same as the hydrogen-to-carbon monoxide ratio of the feed gas.

8. The method according to claim 5, further comprising adding a feed gas to the reactor, wherein the mixing enhancing gas comprises synthesis gas having a hydrogen-to-carbon monoxide ratio that is lower than the hydrogen-to-carbon monoxide ratio of the feed gas.

9. The method according to claim 5, further comprising adding a feed gas to the reactor, wherein the mixing enhancing gas comprises synthesis gas having a hydrogen-to-carbon monoxide ratio that is higher than the hydrogen-to-carbon monoxide ratio of the feed gas.

10. The method according to claim 5 wherein the mixing enhancing fluid is a liquid that comprises liquid hydrocarbons from the product stream of the Fischer-Tropsch reactor or from other processes in a Gas-to-Liquids plant.

11. The method according to claim 5 wherein the mixing enhancing fluid is introduced into the water-rich slurry region by at least one mixing enhancing fluid distributor.

12. The method according to claim 11 wherein the mixing enhancing fluid distributor comprises an annular ring having at least one outlet port.

13. The method according to claim 11 wherein a plurality of mixing enhancing fluid distributors are positioned at different heights in the water-rich slurry region.

14. The method according to claim 11 wherein a plurality of mixing enhancing fluid distributors are positioned at different radial positions in the water-rich slurry region.

15. The method according to claim 5 wherein the mixing enhancing fluid is introduced into the water-rich slurry region through at least one nozzle.

16. The method according to claim 15 wherein the nozzles are positioned at different heights in the water-rich slurry region.

17. The method according to claim 15 wherein the nozzles are positioned at different radial positions in the water-rich slurry region.

18. The method according to claim 1 wherein the flow pattern is changed by providing at least one passive mixing device in the water-rich slurry region.

19. The method according to claim 1 wherein the flow pattern is changed by providing at least one power-driven mixing device in the water-rich slurry region.

20. A method for producing hydrocarbons comprising:
 a) contacting a synthesis gas with a hydrocarbon synthesis catalyst in a multi-phase reactor having an expanded slurry bed, under reaction conditions effective to form a product stream comprising hydrocarbons and water; and
 b) changing the flow pattern of a water-rich slurry region in the reactor so as to cause mixing of slurry from the water-rich slurry region with slurry from the rest of the slurry bed;
 wherein the water-rich slurry region is located between ½ H and H and between ½ R and R, where H is the height of the expanded slurry bed and R is the radius of the reactor; and
 wherein the flow pattern is changed by a method selected from the group consisting of introducing a mixing enhancing fluid into the water-rich slurry region, providing at least one passive mixing device in the water-rich slurry region, providing at least one passive mixing device in the water-rich slurry region, and providing at least one power-driven mixing device in the water-rich slurry region.

21. The method according to claim 20, further comprising diluting the localized water concentration by adding a liquid or a gas.

22. The method according to claim 20, further comprising diluting the localized water concentration by adding a liquid or a gas, wherein the liquid or gas is added in the water-rich region.

23. The method according to claim 20 wherein the predetermined region is located between ¾ H and H and between ¾ R and R.

24. The method according to claim 20 wherein the flow pattern is changed by introducing a mixing enhancing fluid into the water-rich slurry region.

25. The method according to claim 24 wherein the mixing enhancing fluid is a gas or gas mixture selected from the group comprising synthesis gas, inert gas, methane-rich gas, light hydrocarbons, hydrogen containing gas, tail gas from a Fischer-Tropsch reactor, tail gas from a GTL plant, tail gas from an olefin plant, liquids vaporizing at operating conditions, and combinations thereof.

26. The method according to claim 24 wherein the mixing enhancing fluid is a liquid that comprises liquid hydrocarbons from the product stream of the Fischer-Tropsch reactor or from other processes in a Gas-to-Liquids plant.

27. The method according to claim 24 wherein the mixing enhancing fluid is introduced into the water-rich slurry region by at least one mixing enhancing fluid distributor.

28. The method according to claim 27 wherein the mixing enhancing fluid distributor comprises an annular ring having at least one outlet port.

29. The method according to claim 27 wherein a plurality of mixing enhancing fluid distributors are positioned at different heights in the water-rich slurry region.

30. The method according to claim 27 wherein a plurality of mixing enhancing fluid distributors are positioned at different radial positions in the water-rich slurry region.

31. The method according to claim 24 wherein the mixing enhancing fluid is introduced into the water-rich slurry region through at least one nozzle.

32. The method according to claim 31 wherein the nozzles are positioned at different heights in the water-rich slurry region.

33. The method according to claim 31 wherein the nozzles are positioned at different radial positions in the water-rich slurry region.

34. The method according to claim 20 wherein the flow pattern is changed by providing at least one passive mixing device in the water-rich slurry region.

35. The method according to claim 20 wherein the flow pattern is changed by providing at least one power-driven mixing device in the water-rich slurry region.

* * * * *